UNITED STATES PATENT OFFICE.

GEORGE JACOB GAGE, OF HILLYARD, WASHINGTON, ASSIGNOR TO GAGE ELECTRIC COMPANY, OF SPOKANE, WASHINGTON, A CORPORATION.

ARTIFICIAL RESISTANCE.

1,105,070.

Specification of Letters Patent.   Patented July 28, 1914.

No Drawing.   Application filed March 31, 1913. Serial No. 757,973.

*To all whom it may concern:*

Be it known that I, GEORGE JACOB GAGE, a citizen of the United States, residing at Hillyard, in the county of Spokane and State of Washington, have invented certain new and useful Improvements in Artificial Resistances, of which the following is a specification.

This invention relates to a non-metallic resistance, particularly valuable for use in electric heaters; and it comprises a resistance made up of a relatively small amount of graphite as the main conducting element together with a relatively large proportion of carborundum as the resistance material, these two substances being in a finely divided and intimately mixed condition and bound together by a binding material comprising silica in a crystalline form, the whole resistance element or mass being of a coherent nature and of the desired shape or form.

The object of the invention is the production of a resistance element particularly valuable for use in electric heaters or in heating by electricity which will be compact and efficient and which will enable the production of high temperatures with a current of low voltage.

Other objects of the invention will be hereinafter disclosed.

In making the novel resistance of the present invention a small amount of graphite in powdered form is intimately mixed with a relatively large amount of carborundum. In practice I find that the proportions of seven pounds of carborundum to one pound of graphite give excellent results. After thoroughly mixing these powdered materials they are made into a plastic mass or a stiff paste by means of an inorganic binding material. As such a binding material alkali silicates and particularly sodium silicate in solution are particularly advantageous. When sodium silicate is used as binder about equal parts of the silicate and of water are used to mix with the mixture of carborundum and graphite to form the desired plastic and moldable mass. The consistency of the mass should be that of a stiff paste which can be molded and shaped. After molding or shaping, the mass is put under pressure of about 800 to 1000 pounds in order to compact the same and homogenize the same. After thus molding and pressing, the shaped resistances are put in a slow oven and baked, the heat being gradually increased until the whole mass becomes annealed and a sufficiently high temperature is reached. During this heating the sodium silicate is decomposed and the sodium oxid removed by volatilization, leaving pure silica as binder. The temperature of the furnace should be finally maintained such as to enable this reaction to be substantially completed. After removal from the furnace the resistance is ready for use.

In the present resistance composition the graphite acts as the essential conductor and the carborundum as the essential resistance. The proportions indicated of these two ingredients, when properly combined as described, give a resistance in which the graphite is present only to a relatively small extent, but nevertheless to a sufficient extent to exert a substantial selective conducting action upon the current. As a result, when the current is passed through the resistance it tends to follow the graphite which is present only to a relatively small extent and arcs are formed between the particles of carborundum, a multitude of small arcs being thus formed which result in the generation of an intense heat. This heating action can be further increased by increasing the amount of carborundum, the graphite still being present in sufficient amount to exert a selective conducting action throughout the mass.

When sodium silicate is used as binder and the silica deposited as the effective binder of the solid mass, by heating there results a coherent bond of deposited silica in a more or less crystalline form which hold the minute particles of the mass together and further increases its heating capacity.

The present resistance element can be used in general for purposes of electrical resistance and is particularly valuable for use in electric heating apparatus. For instance, when used in an electric iron it holds the heat well and does not deteriorate after continued use. Because of its peculiar properties it requires only a low voltage to generate intense heat. A temperature of over 600° has been obtained with a 110 volt current, consuming 75 amperes. As compared with iron or carbon resistances the present resistance composition or element offer very material advantages since only small bars are necessary. For instance, a test bar made according to the present invention, about four inches wide by three-quarters of an inch thick and twenty-three inches long has been used with good results in melting ores in cases where previously resistances with an area more than one hundred times as great have been employed.

The present composition can be molded into any desired shape to adapt it to a desired condition. It can be applied to an electric heater or to an electric iron or to other heating apparatus. Connections are made with this resistance by means of carbon or other conductors. In applying the present element or composition to electric heaters, it is sometimes advantageous to control the heat so that it will be given off more at one side than at the other. I have found that one side of the present resistance element can be effectively insulated and the heat directed principally from the other side by covering the side which it is desired to insulate with a paste which may be made of the poorer qualities of carborundum. This layer of carborundum acts as an effective insulator. In case of a resistance element used for cooking, etc., such a coating of insulation could be applied to the sides and bottom of the heating element causing the heat to be given off principally at the top.

Variations can be made in the foregoing description without departing from the spirit and scope of the invention.

I consider that the present composition is made up of a relatively small amount of graphite as conductor, together with a relatively large amount of (several times as much) carborundum as resistance, these two ingredients being intimately combined and bound into a coherent mass by a bond of an inorganic nature which is advantageously silica.

I claim:

1. An electrical resistance comprising finely divided graphite and carborundum in the proportions of about one part by weight of graphite to seven of carborundum, said ingredients being formed and bound together by a suitable inorganic binding material into a coherent compacted and molded form by pressure and by heating.

2. An electrical resistance comprising graphite and carborundum in the proportions of about one part of graphite to seven of carborundum, these ingredients being formed and bound into a coherent, compacted and molded form by pressure and by heating, the effective binding agent for said materials comprising silica set free from alkaline silicate during the heating of said resistance.

3. An electrical resistance comprising finely divided graphite and carborundum in the proportions of about one part by weight of graphite to seven of carborundum, said ingredients being formed and bound together by a suitable inorganic binding material into a coherent compacted and molded form by pressure and by heating, and said resistance having on one or more sides thereof a heat insulating coating integrally united therewith.

In testimony whereof I affix my signature in presence of two witnesses.

GEORGE JACOB GAGE.

Witnesses:
HAROLD SCANTLEBURY,
EDNA BROYLES.